US008781884B2

(12) United States Patent
O'Shea, Jr. et al.

(10) Patent No.: US 8,781,884 B2
(45) Date of Patent: Jul. 15, 2014

(54) SYSTEM AND METHOD FOR AUTOMATICALLY GENERATING WORK ENVIRONMENT GOALS FOR A MANAGEMENT EMPLOYEE UTILIZING A PLURALITY OF WORK ENVIRONMENT SURVEY RESULTS

(75) Inventors: Daniel P. O'Shea, Jr., Glastonbury, CT (US); Sallie M. Normandeau, Wilbraham, MA (US); Karin L. Reinhardt, South Glastonbury, CT (US); Barbara M. Kenney, North Granby, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 369 days.

(21) Appl. No.: 12/859,462

(22) Filed: Aug. 19, 2010

(65) Prior Publication Data
US 2012/0047000 A1 Feb. 23, 2012

(51) Int. Cl.
*G06Q 10/00* (2012.01)
(52) U.S. Cl.
USPC ............................................. 705/7.39
(58) Field of Classification Search
CPC ............... G06Q 10/06398; G06Q 10/06393; G06Q 10/105
USPC ........................................... 705/7.39
See application file for complete search history.

(56) References Cited

U.S. PATENT DOCUMENTS

| | | | | |
|---|---|---|---|---|
| 4,671,772 A | * | 6/1987 | Slade et al. | 434/219 |
| 4,863,384 A | * | 9/1989 | Slade | 434/107 |
| 5,743,742 A | * | 4/1998 | Morrel-Samuels | 434/236 |
| 5,795,155 A | * | 8/1998 | Morrel-Samuels | 434/107 |
| 5,909,669 A | * | 6/1999 | Havens | 705/7.42 |
| 6,067,537 A | * | 5/2000 | O'Connor et al. | 706/47 |
| 6,119,097 A | * | 9/2000 | Ibarra | 705/7.42 |
| 6,735,570 B1 | * | 5/2004 | Lacy et al. | 705/7.14 |
| 6,754,874 B1 | * | 6/2004 | Richman | 715/205 |
| 6,901,301 B2 | * | 5/2005 | Bradshaw | 700/48 |
| 6,915,269 B1 | * | 7/2005 | Shapiro et al. | 705/7.32 |
| 7,069,266 B2 | * | 6/2006 | Calderaro et al. | 707/783 |
| 7,080,057 B2 | * | 7/2006 | Scarborough et al. | 706/60 |
| 7,111,008 B2 | | 9/2006 | Nomura et al. | |
| 7,266,340 B2 | * | 9/2007 | Bresciani | 434/350 |
| 7,367,808 B1 | * | 5/2008 | Frank et al. | 434/219 |
| 7,373,306 B1 | * | 5/2008 | Lieberman et al. | 705/3 |

(Continued)

OTHER PUBLICATIONS

Dominic, P.D.D. et al, A Decision Support System for Performance Appraisal Fifth International Conference on Information Technology, IEEE, 2008.*

(Continued)

*Primary Examiner* — Scott L Jarrett
(74) *Attorney, Agent, or Firm* — Howard IP Law Group, PC

(57) ABSTRACT

Employees of an organization are surveyed concerning their opinions about the work environment provided by the organization. A computer system that includes a survey question storage module, a survey administration component, a survey results storage module, and a survey analysis component is used to administer the survey and to analyze the survey results. The computer system generates work environment index (WEI) scores for the managers in the organization to summarize the results of the survey as to employees who are within the managers' departments. The WEI scores are made the subject of performance goals for the managers and are displayed to the managers via their personal computers.

18 Claims, 13 Drawing Sheets

(56) References Cited

U.S. PATENT DOCUMENTS

| | | | | |
|---|---|---|---|---|
| 7,584,117 | B2* | 9/2009 | Bubner | 705/7.36 |
| 7,593,861 | B2 | 9/2009 | Morrel-Samuels | |
| 7,660,723 | B2* | 2/2010 | Cirulli et al. | 705/1.1 |
| 7,668,746 | B2* | 2/2010 | Eisma et al. | 705/7.14 |
| 7,693,808 | B2* | 4/2010 | Tingling | 706/45 |
| 7,778,865 | B1* | 8/2010 | Kane | 705/7.42 |
| 7,783,513 | B2* | 8/2010 | Lee | 705/7.42 |
| 7,792,278 | B2* | 9/2010 | Watson et al. | 379/266.1 |
| 7,870,014 | B2* | 1/2011 | Baughn et al. | 705/7.14 |
| 7,991,641 | B2* | 8/2011 | Vegliante et al. | 705/7.42 |
| 8,019,640 | B2* | 9/2011 | Barel et al. | 705/7.32 |
| 2002/0103805 | A1* | 8/2002 | Canner et al. | 707/100 |
| 2002/0111838 | A1 | 8/2002 | Welbourne | |
| 2003/0229529 | A1* | 12/2003 | Mui et al. | 705/8 |
| 2004/0060051 | A1* | 3/2004 | Bradshaw | 718/106 |
| 2004/0088177 | A1* | 5/2004 | Travis et al. | 705/1 |
| 2004/0215503 | A1* | 10/2004 | Allpress et al. | 705/11 |
| 2005/0015291 | A1* | 1/2005 | O'Connor | 705/8 |
| 2005/0026119 | A1* | 2/2005 | Ellis et al. | 434/219 |
| 2005/0144022 | A1* | 6/2005 | Evans | 705/1 |
| 2005/0181339 | A1 | 8/2005 | Hewson | |
| 2005/0197988 | A1* | 9/2005 | Bublitz | 706/46 |
| 2005/0209709 | A1* | 9/2005 | Bradshaw | 700/2 |
| 2006/0046233 | A1* | 3/2006 | Byham | 434/236 |
| 2006/0136240 | A1 | 6/2006 | Cleveland et al. | |
| 2006/0161456 | A1* | 7/2006 | Baker et al. | 705/2 |
| 2006/0184416 | A1* | 8/2006 | Nag | 705/11 |
| 2007/0038505 | A1* | 2/2007 | Barnes, IV et al. | 705/11 |
| 2007/0192163 | A1* | 8/2007 | Barr | 705/10 |
| 2008/0046297 | A1* | 2/2008 | Shafer | 705/4 |
| 2008/0059292 | A1* | 3/2008 | Myers et al. | 705/11 |
| 2008/0114608 | A1* | 5/2008 | Bastien | 705/1 |
| 2009/0210296 | A1* | 8/2009 | Goolden | 705/11 |
| 2009/0271252 | A1* | 10/2009 | AmEnde | 705/11 |
| 2009/0292590 | A1* | 11/2009 | Zaidi | 705/10 |
| 2009/0327051 | A1* | 12/2009 | Nerby | 705/11 |
| 2010/0070348 | A1* | 3/2010 | Nag | 705/11 |
| 2010/0198659 | A1* | 8/2010 | Meltzer et al. | 705/11 |
| 2011/0184786 | A1* | 7/2011 | Roman Stoica et al. | 705/7.39 |

OTHER PUBLICATIONS

Bracken, David W. et al., High-tech 360 Training & Development, vol. 52, No. 8, Aug. 1998.*

Cooley, Kevin L., Developing CH2MHILL's PMDF: An Employee-Driven, Competency-Based Development Framework for Project Managers, Washington State University, May 2001.*

Hillesheim, Sherry, The leader meter: A feedback survey Nursing Management, vol. 29, No. 3, Mar. 1998.*

Chang, Jing-Ron et al., A fuzzy-based military officer performance appraisal system Applied Soft Computing, vol. 7, 2007.*

Yee, C.C. et al., Performance Appraisal System using Multifactorial Evaluation Model World Academy of Science, Engineering and Technology, vol. 53, 2009.*

Guinn, Stephen L., Executive development—why successful executives continue to change Career Development International, vol. 4, No. 4, 1999.*

Seevers, Captain James S., Management by Objectives and Performance Appraisal Air University Review, Sep.-Oct. 1979.*

Furnham, Adrian, Rating a boss, a colleague and a subordinate Journal of Management Psychology, vol. 17, No. 7/8, 2002.*

Shaw, Douglas G. et al., the performance measurement, management, and appraisal sourcebook Human Resources Development Inc., HRD Press 1995.*

Pritchard, R. D. et al., Designing a goal-setting system to enhance performance: A practical guide. Organizational Dynamics, vol. 17, 1988.*

Bernardin, John H., Subordinate Appraisal: A Valuable Source of Information About Managers Human Resource Management, vol. 25, No. 3, Fall 1986.*

Osborne, J.E., Upward Evaluations: What Happens When Staffers Evaluate Supervisors Supervisory Management, vol. 35, No. 3, Mar. 1990.*

Nevels, Paul, Why Employees Are Being Asked to Rate Their Supervisor Supervisory Management, vol. 34, No. 12, Dec. 1989.*

Pinsonnault, Jean-Francios, Granding the boss CMA, vol. 66, No. 5, Jun. 1992.*

Bracken, David W., Straight Talk About Multirater Feedback Training & Development, vol. 48, No. 9, Sep. 1994.*

Church, Allan H., First-Rate Multirater Feedback Training & Development, vol. 49, No. 8, Aug. 1995.*

King, Julia, Managers tweak style after they get staff feedback via Notes Computerworld, vol. 31, No. 11, Mar. 17, 1997.*

Clayton, Kaziah et al., The Development of a Managerial Performance Appraisal System in a Social Service Agency Public Personnel Management Journal, vol. 10 No. 2, Summer 1981.*

State of New Mexico State Personnel Board—Performance Appraisal and Development User's Manual State of New Mexico, Jul. 2001.*

* cited by examiner

8. In my department, we are good at implementing changes.

○ Strongly agree
○ Somewhat agree
○ Neutral
○ Somewhat disagree
○ Strongly disagree

SUBMIT — 702

*FIG. 7*

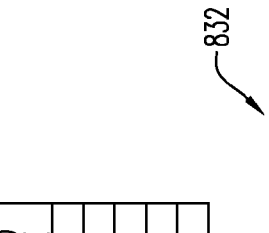
FIG. 8A

| LEVEL ⟵852 | DISTRIBUTION ⟵854 | LOWER BOUND ⟵856 | UPPER BOUND ⟵858 | IMPROVEMENT GOAL ⟵860 | RANGE ⟵862 |
|---|---|---|---|---|---|
| A | 10% | 4.284 | 5.00 | 0% | +/- 0.05 |
| B | 20% | 4.056 | 4.283 | 0% | +/- 0.05 |
| C | 30% | 3.812 | 4.055 | 1% | +/- 0.05 |
| D | 30% | 3.431 | 3.811 | 2% | +/- 0.05 |
| E | 10% | 2.00 | 3.430 | 7% | 0.0 TO +0.05 |

SYSTEM AND METHOD FOR AUTOMATICALLY GENERATING WORK ENVIRONMENT GOALS FOR A MANAGEMENT EMPLOYEE UTILIZING A PLURALITY OF WORK ENVIRONMENT SURVEY RESULTS

FIELD

The present invention relates to computer systems, and more particularly to computer systems used in connection with human resources administration.

BACKGROUND

The long term profitability of a commercial enterprise depends critically on the level of service it provides to its customers and the customer loyalty that the organization is able to command. Quality of customer service and customer loyalty are, in turn, highly dependent on the job performance of the organization's employees. Further, the level of employees' job performance is, to a great extent, a function of the quality of the work environment provided to the employees by the organization.

It is not unusual for an organization to take surveys of its employees' attitudes toward the organization, and to express an intention that the organization be a good place to work. However, conventional approaches to improving an organization's work environment have been complicated and indirect and not necessarily very effective. The present inventors have recognized a need for a relatively simple and straightforward mechanism for holding managers accountable for the work environment in their departments.

SUMMARY

A computer system includes a survey results storage module. The survey results storage module stores survey data that indicates the employees' responses to a set of survey questions. The survey questions are for measuring attitudes of employees towards their work environment.

In addition, the computer system includes a survey analysis component which is coupled to the survey results storage module. The survey analysis component analyzes the survey data to generate work environment index results. Each of the work environment index results corresponds to a particular management employee and is derived from survey data which corresponds to a group of employees who make up the direct and indirect reports for the management employee. The management employee is one of a number of management employees of the company. Most or all of the management employees each receive a respective work environment index result.

The survey analysis component includes a processor that is programmed to analyze the survey data stored in the survey results storage module.

The computer system also includes a display component which is coupled to the survey analysis component. The display component displays the work environment index results to one or more of the management employees.

The display component displays the work environment index results in a user interface format. The user interface format includes an interface element that is actuatable by the management employee. When the interface element is actuated by the management employee, the survey analysis component responds by downloading additional information to the display component. The additional information expands a work environment index result to represent a first portion of the result that is attributable to employees' intent not to seek other employment, and another portion of the result that is attributable to the employees' feelings of inspiration toward good work performance.

The work environment index results can also be used to derive performance goals for the management employees. Future work environment index results can be tracked against the managers' performance goals so that the managers can be evaluated on the quality of work environment provided for their subordinates.

With these and other advantages and features of the invention that will become hereinafter apparent, the invention may be more clearly understood by reference to the following detailed description of the invention, the appended claims, and the drawings attached hereto.

BRIEF DESCRIPTION OF THE DRAWINGS

FIG. 7 is an example screen display that may be provided to end users of the system.

FIG. 8A is a diagram that illustrates calculations performed as part of the process of FIGS. 6 and 8.

FIG. 8B is a table that illustrates an example approach to setting work environment index goals for managers as part of the process of FIG. 6.

DETAILED DESCRIPTION

In general, and for the purposes of introducing concepts of embodiments of the present invention, employees of a large organization are surveyed to gain insight into the work environment provided in the organization and in departments of the organization. The survey results are analyzed to produce an average work environment index for each department and for the organization as a whole. The work environment index is expressed as a single score (e.g., a three-place decimal score in the range of 1 to 5) calculated for each manager to indicate the perceptions of his subordinates as to the work environment in the manager's department. This work environment index can thus distill employee attitudes to a single measurable and trackable number, by which managers can be made accountable for the type of work environment as experienced by the employees who directly or indirectly report to them.

Figure 1:
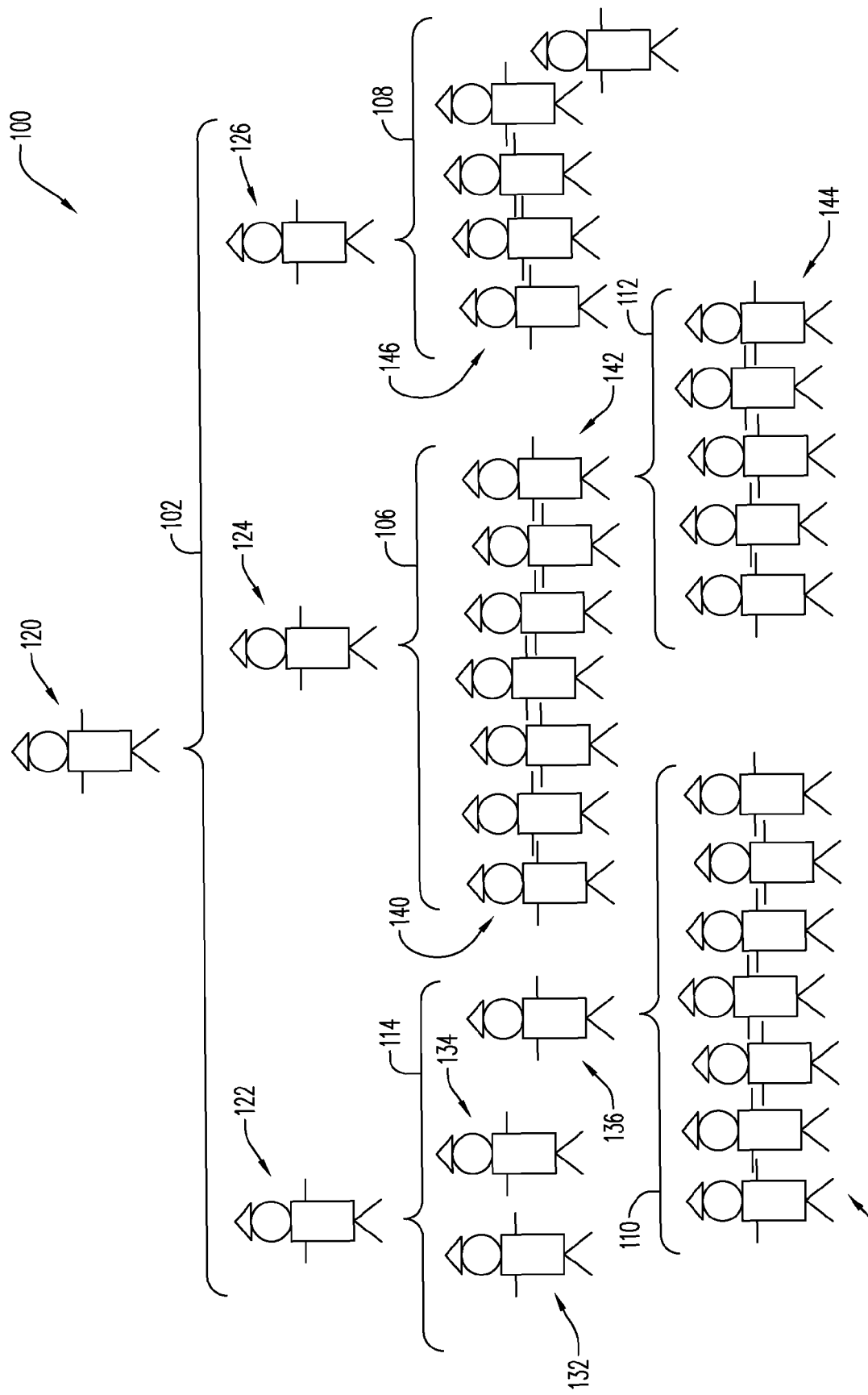
FIG. 1 schematically illustrates an organizational hierarchy for which the present invention may be applied.

FIG. 1 schematically illustrates an organizational hierarchy 100 for which the present invention may be applied. The organization in question may be a for-profit company (such as a large financial services or insurance company), a not-for-profit organization or a government agency, or a department or division of such organizations. The brackets 102, 104, 106, 108, 110 and 112 shown in the drawing are indicative of reporting relationships among various managers and employees. The drawing itself should be understood to be simplified, in that a much larger organization with many more employees and more levels of management could be represented in similar terms.

The top manager for the organization is indicated at 120. All the other individuals represented in the drawing are direct or indirect reports for the manager 120.

The direct reports of the manager 120 are indicated at 122, 124 and 126. All three of these individuals have direct reports in turn. In particular, manager 122 has three direct reports 132, 134 and 136. Individuals 132 and 134 do not supervise any employees, but individual (manager) 136 has a group of direct reports indicated at 138. Thus the organization/department that reports to manager 122 consists of individuals 132, 134, 136 and the group 138.

Similarly, manager 124 has a group of employees 140 reporting directly to him/her. Of the group 140, an individual/manager 142 supervises a group of employees 144. Accordingly, the indirect and direct reports for manager 124 consist of groups 140 and 144.

Manager 126 has only direct reports, represented by group 146.

According to one feature of the present invention, each manager whose direct and indirect reports total to at least a threshold number (e.g., five) may be assigned a work environment index (WEI) result or score, and is held responsible for meeting goals in the future with respect to WEI results derived from future employee surveys. The WEI result for a manager may be calculated based on survey results obtained from all of the individuals in his/her organization. Details of example methods for calculating WEI results will be discussed below.

Figure 2:
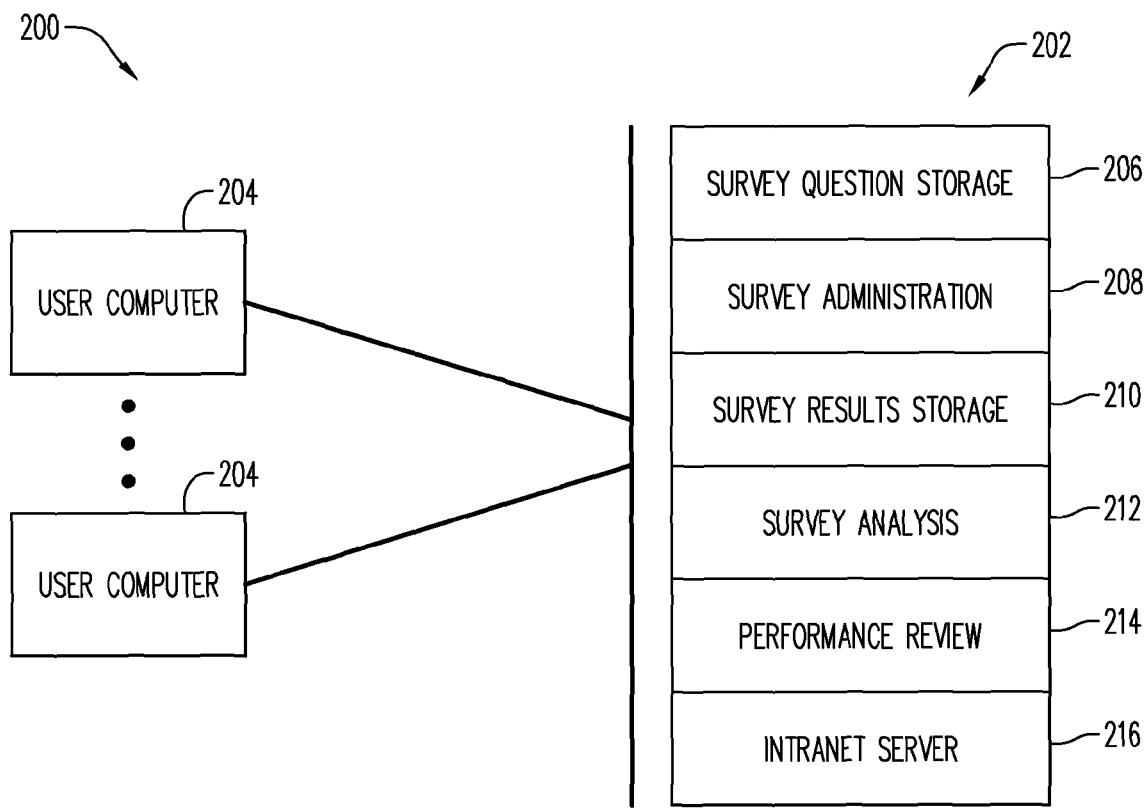
FIG. 2 is a block diagram illustration of a computer system provided in accordance with the present invention.

FIG. 2 is a block diagram illustration of a computer system 200 provided in accordance with the present invention.

The computer system 200 may include a central server computer 202 and user computers 204 coupled to the central server computer 202 to receive downloads of information from the server 202 and to upload information to the server 202. The central server 202 (also hereinafter referred to as a "Human Resources (HR) server computer") may include the following modules/components/functions, among others: (A) a survey question storage module 206 which stores a set of survey questions to be administered to the employees; (B) a survey administration component 208 which functions to administer the survey questions to the employees via the user computers 204; (C) a survey results storage module 210 which stores data that indicates the employees' responses to the survey questions; (D) a survey analysis component 212 which analyzes the survey data to generate the above-mentioned WEI results for the various managers in the organization; (E) a performance review component 214 which generates, stores, tracks and administers various performance review measures for the managers (and perhaps also for non-management employees), including performance goals related to current and future WEI results; and (F) an intranet server function 216 which implements the host/server function for the server computer 202.

Any one or more of the components/modules/functions shown as constituents of the server computer 202 may be coupled to any one or more others of the components/modules/functions.

Figure 3:
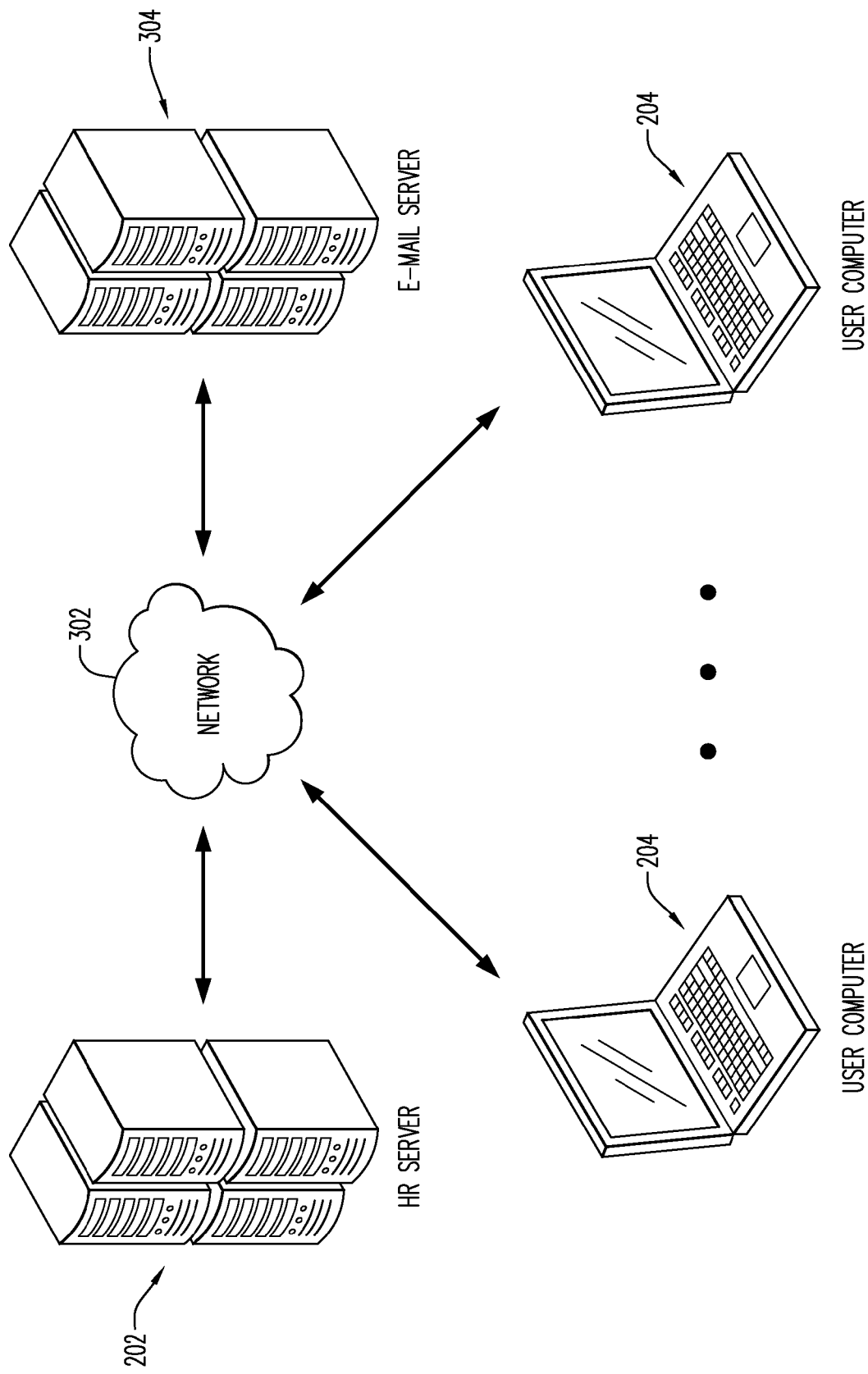
FIG. 3 is an alternative block diagram representation of the computer system of FIG. 2.

FIG. 3 is an alternative block diagram representation of the computer system 200. As depicted in FIG. 3, the computer system 200 may include a conventional data communication network 302. Further the computer system 300 may include the above-mentioned HR server computer 202. The HR server computer 202 is coupled to the data communication network 302, and may perform or facilitate general functions of the organization's HR department, in addition to the WEI-related functions described herein.

The computer system 200 may also include the above-mentioned user computers 204 and a conventional electronic mail server 304. The e-mail server 304 and the user computers 204 may be coupled to the communication network 302. The e-mail server 304 may handle internal messaging among at least some of the components of the computer system 200.

The components of the computer system 200 may be entirely conventional in their hardware aspects. The e-mail server 304 may operate entirely conventionally, and the HR server computer 202 and the user computers 204 may also operate in a conventional manner, except for their functions and interactions related to the WEI, as described herein.

Figure 4:
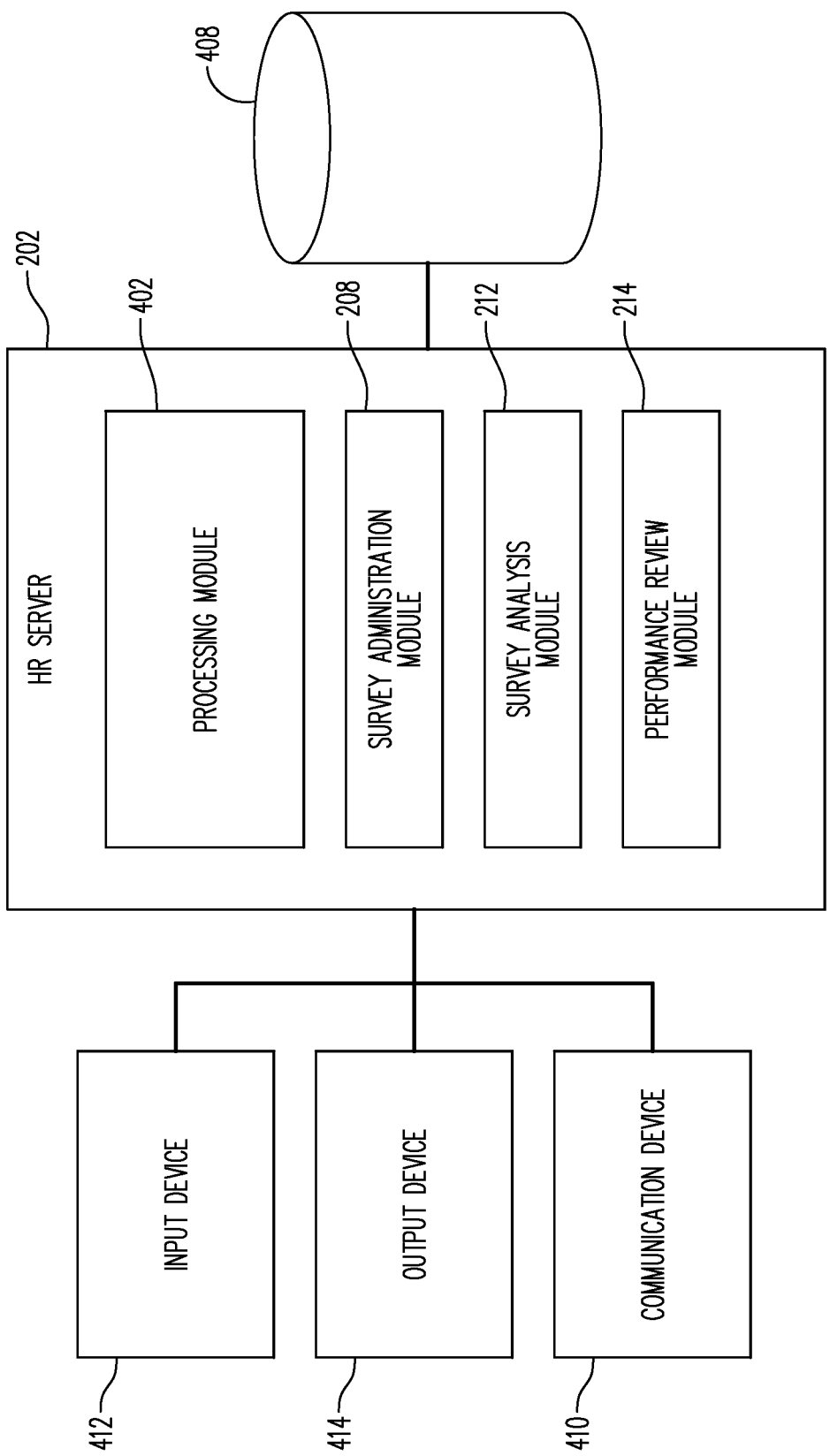
FIG. 4 is block diagram that illustrates a server computer that is a component of the system of FIGS. 2 and 3.

FIG. 4 is a more hardware-oriented block diagram representation of the HR server computer 202. The HR server computer 202 may be conventional in terms of its hardware aspects.

As depicted in FIG. 4, the HR server computer 202 includes a processing module 402, which may be constituted by one or more conventional computer processors. The HR server computer 202 further includes the above-mentioned survey administration component 208 (also referred to as a "survey administration module"), survey analysis component 212 (also referred to as a "survey analysis module") and performance review component 214 (also referred to as a "performance review module"). The modules 208, 212, 214 may be constituted, at least in part, by the processing module 402 in combination with suitable software program instructions. Aspects of the software program instructions for the modules 208, 212, 214 will be described below.

The HR server computer 202 further includes one or more storage devices, represented by item 408 in FIG. 4. The storage devices 408 are coupled for data communication with the processing module 402 and may comprise any appropriate information storage device, including combinations of magnetic storage devices (e.g., magnetic tape and hard disk drives), optical storage devices, and/or semiconductor memory devices (such as Random Access Memory (RAM) devices and Read Only Memory (ROM) devices). At least some of these devices may be considered computer-readable storage media, or may include such media. The storage devices 408 may store the above-mentioned software program instructions and/or other program instructions to control the processing module 402 such that the HR server computer 202 provides desired functionality, as described herein. Thus, the storage devices 408 store one or more programs for controlling the processing module 402. The processing module 402 performs instructions of the programs, and thereby operates in accordance with aspects of the present invention. In some embodiments, the programs may include one or more conventional operating systems. The programs may further include application programs such as a conventional data communication program and a conventional database management program. Aspects of the application programs will be described below. Still further, the storage devices 408 may store one or more databases relating to employee survey questions and results, WEI calculations and results, and management and employee performance review information. The above-mentioned survey question storage module 206 (FIG.

2) and survey results storage module 210 may be at least partly constituted by the storage devices 408.

Continuing to refer to FIG. 4, the HR server computer 202 may further include one or more communication devices 410 coupled to the processing module 402. The communication devices 410 may function to facilitate communication with, for example, other devices (such as the user computers 204). In addition, the HR server computer 202 may include one or more input devices 412 such as a keyboard, a keypad, a mouse or other pointing device, a microphone, knob or a switch, an infra-red (IR) port, a docking station and/or a touch screen. The input device(s) 412 may be coupled to the processing module 402. Still further the HR server computer 202 may include one or more output devices 414, such as a display (e.g., a display screen), a speaker, and/or a printer. The output devices 414 may also be coupled to the processing module 402.

Figure 5:
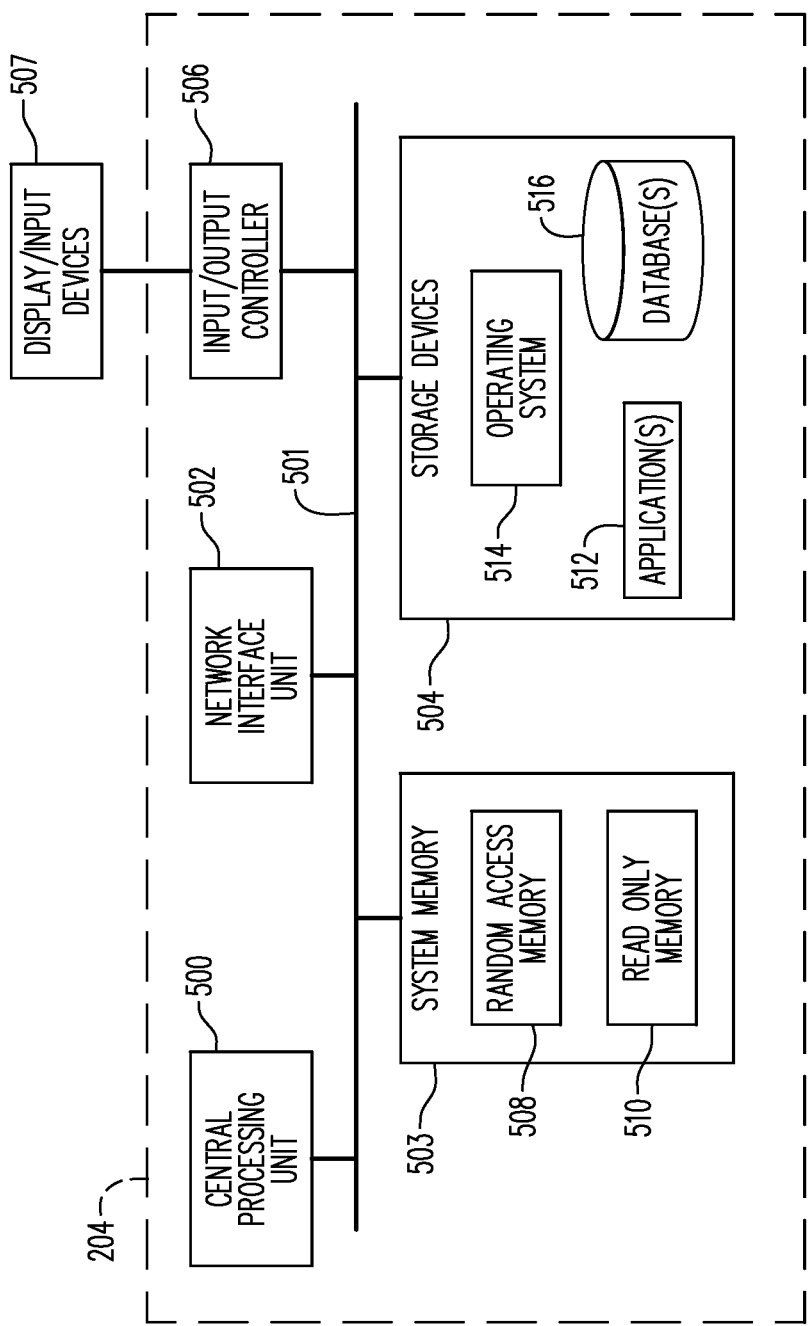
FIG. 5 is a block diagram that illustrates a computer used by an end user of the system of FIGS. 2 and 3.

FIG. 5 is a block diagram representation of a typical one of the user computers 204 shown in FIGS. 2 and 3. The user computer 204 may be conventional in terms of its hardware aspects.

As depicted in FIG. 5, the user computer 204 includes a data bus 501. The user computer 204 also includes a computer processor (CPU) 500 which is operatively coupled to the data bus 501 and which may be constituted by one or more conventional processors. The user computer 204 further includes a network interface unit 502, system memory 503, one or more storage devices 504, and an input/output controller 506, all of which are also operatively coupled to the data bus 501.

The network interface unit 502 may function to facilitate communication with, for example, other devices (such as the HR server computer 202). The input/output controller 506 may couple the user computer 204 to input and output devices (not shown) such as a keyboard, a keypad, a mouse or other pointing device, a microphone, knob or a switch, an infra-red (IR) port, a docking station, a touch screen, a display (e.g., a display screen), a speaker, and/or a printer. The display and/or input devices are represented by block 507 and may, e.g., include a flat panel display or other display device for presenting screen displays to the user of the user computer 204.

The system memory 503 may be constituted by, for example, a suitable combination of Random Access Memory (RAM) devices 508 and Read Only Memory (ROM) devices 510.

Storage devices 504 may comprise any appropriate information storage device, including combinations of magnetic storage devices (e.g., magnetic tape and hard disk drives), optical storage devices, and/or semiconductor memory devices. At least some of these devices (and/or all or part of the system memory 503) may be considered computer-readable storage media, or may include such media.

Storage devices 504 store one or more programs (at least some of which being indicated by blocks 512, 514) for controlling CPU 500. CPU 500 performs instructions of the programs, and thereby operates in accordance with aspects of the present invention. In some embodiments, the programs may include one or more conventional operating systems, indicated by block 514 in FIG. 4. The programs may further include application programs (block 512) such as a conventional data communication program and a conventional database management program. The application programs 512 may, for example, include a conventional electronic mail program and a conventional browser.

There may also be stored in the storage devices 504 other software, such as device drivers, etc.

Still further, the storage devices 504 may store one or more databases (block 516) for storing and managing the data relating to user requests handled by the database analyst.

Figure 6:
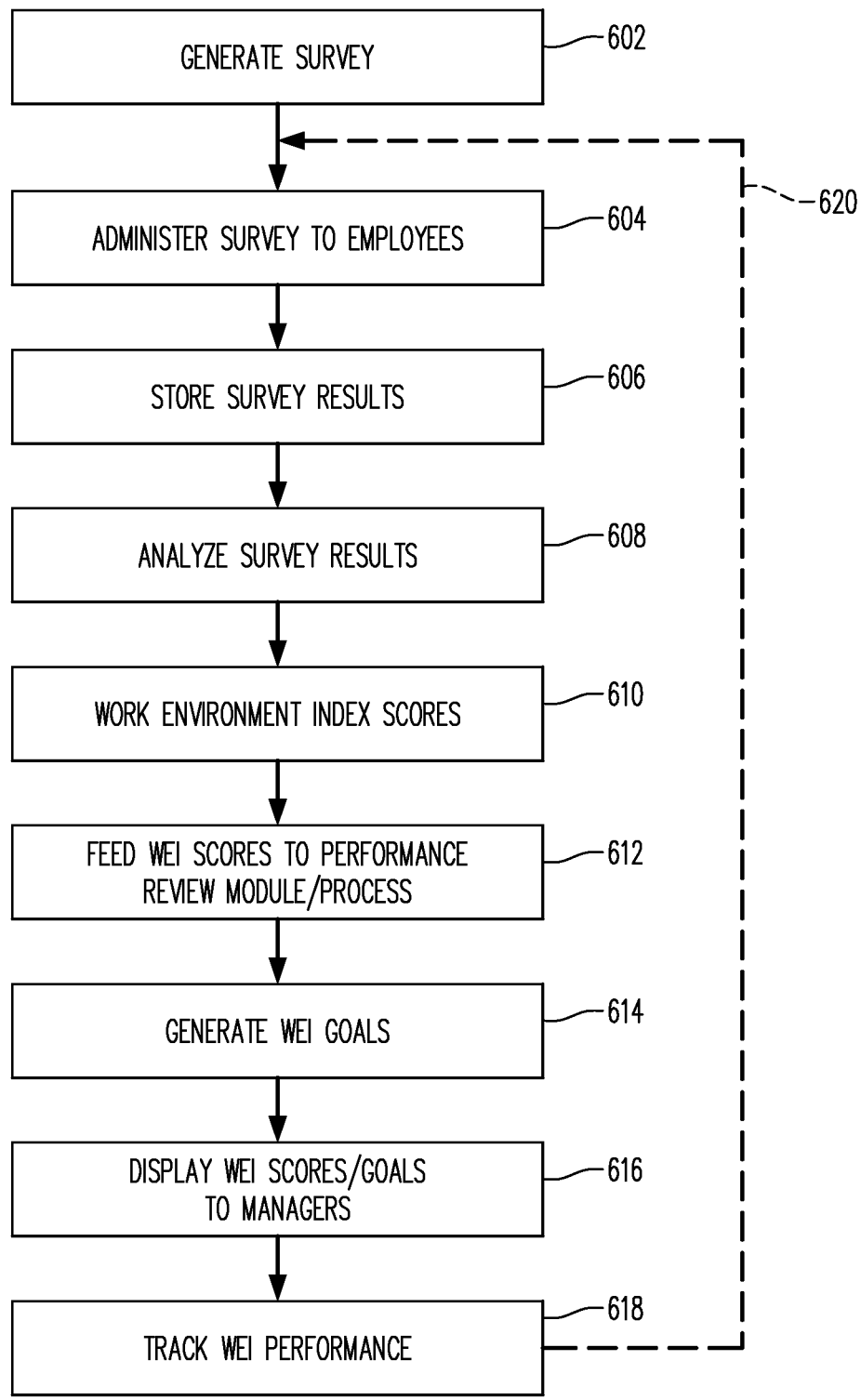
FIG. 6 is a flow chart that illustrates a process that may be performed in the system of FIGS. 2 and 3.

FIG. 6 is a flow chart that illustrates a process that may be performed in the computer system 200 of FIGS. 2 and 3.

At 602 in FIG. 6, one or more individuals skilled in employee survey design may design a survey to be used in generating the above-mentioned WEI results for the managers in the organization. The survey may be dedicated for the purpose of producing the WEI or may include questions directed to other topics as well. The subjects addressed by the survey questions may include (1) employee attitudes toward the organization's/department's compensation policies, (2) training and development opportunities in the organization, (3) the department manager's leadership, (4) organizational culture, and (5) the employee's attitudes toward his/her work assignments.

Questions may be formatted for answers on a five point scale, ranging from "strongly agree" (5 points); "somewhat agree" (4 points); "neutral" (3 points); "somewhat disagree" (2 points); to "strongly disagree" (1 point).

Example questions may include:

"In my department, outstanding performance is rewarded with higher compensation."

"I have a clear understanding of my department's strategies, goals and priorities."

"In my department, we are good at implementing changes."

"I would rather work for (this company) than most other companies."

"I have the opportunity to build my career at (this company)."

It is within the abilities of those who are skilled in the art to design an appropriate set of survey questions based on the above disclosure as well as additional information contained hereinbelow. In one embodiment, the total number of WEI-relevant questions may be 15, although a smaller or larger number of such questions may alternatively be used.

Once the survey question set has been created, it may be stored in the survey question storage module 206.

Referring again to FIG. 6, at 604 the survey question set is administered to the employees. This may, for example, be done via the organization's intranet in accordance with known techniques. For example, a mass e-mail message may be sent to the employees, requesting that they access a survey page hosted by the HR server computer 202. The survey page may then administer the survey to each employee as she/he accesses the survey page. The HR server computer 202 may keep track of whether each employee has responded to the survey and may send out reminders to the employees by e-mail as needed.

FIG. 7 is an example screen display that may be downloaded from the HR server computer 202 to one of the user computers 204 in connection with administering the survey to the employee who uses the user computer 204. The screen display of FIG. 7 may be displayed on the display component (item 507, FIG. 5) of the user computer 204. In particular, FIG. 7 shows one of the survey questions, with radio buttons arranged to allow the employee to enter his/her response to the question. The employee may then "click" on the "Submit" button 702 to enter his/her response. The HR server computer 202 will then download the next question screen display to the user computer 204.

Referring again to FIG. 6, at 606, the HR server computer 202 stores the results (i.e., the employees' responses) of administering the set of survey questions. While the HR server computer 202 receives the survey results and/or after all results have been received, the HR server computer 202 proceeds to analyze the survey results, as indicated at 608. In some embodiments, the analysis may include calculating a WEI score based on the survey results from each employee as a weighted average of the employee's responses, as scored on the above-described five-point scale. (In alternative embodiments, the WEI scores may be generated from aggregated averages of employee responses to individual questions, for groups of employees who make up all the reports—direct or indirect—for a particular manager.) The weights to be applied to the individual's question scores may have been determined previously based on analysis of earlier experimental administrations of the set of survey questions. An example analysis of such experimental results will now be described. (The above-described administration of the survey for the purpose of assigning actual WEI scores to managers, and the ensuing analysis of those survey results to produce the WEI scores, will be referred to as "operational" surveying and analysis, in contrast to the preliminary experimental results.)

One key goal to be achieved in providing a superior work environment for employees is to enhance the employees' engagement in their jobs. In the case of an employee and his/her job, "engagement" may be defined as the extent to which the employee is committed to his/her job assignments, how hard he/she works, and how likely he/she is to continue employment with the company. Employee engagement can be a key factor in how well employees perform their work and their retention with the company. It is believed that the intrinsic interest and rewards of the job assignments, the organizational culture, the manager's leadership performance, opportunities for learning and development, and compensation practices are the primary factors that contribute to employee engagement. Employee engagement may produce two main benefits—an intent to remain employed with the same company (employee retention), and inspiration for the employees to consistently perform their best work.

The weights to be applied to each survey question may be calculated based on the degree of importance of each of the individual question results relative to the two above-mentioned outcomes of employee engagement, i.e., intent to stay with the company and inspiration to superior performance. In some embodiments, the degree of importance for each question may be determined via a technique known as relative weight analysis. As is known to those who are skilled in the art, relative weight analysis determines, for each independent variable, the proportion of variance in a dependent variable explained by the respective independent variable. For the experimental survey analysis, there are two dependent variables, namely employee attitude regarding intent to stay, and employee attitude regarding inspiration to do their best work. The independent variables are the average scores for each survey question.

Figure 7A:
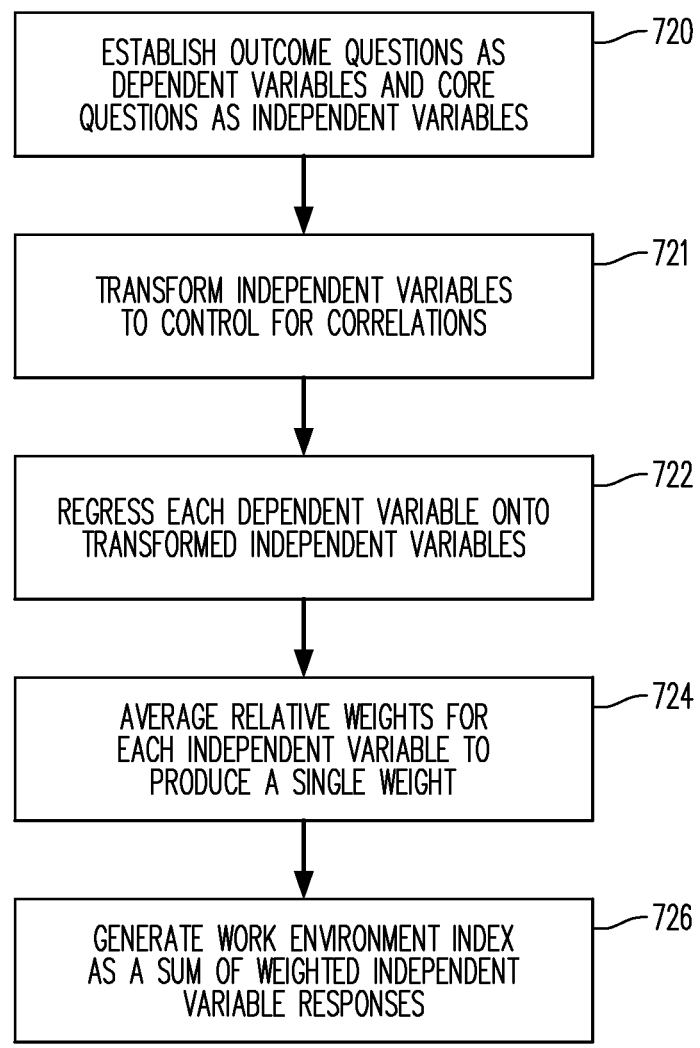
FIG. 7A is a flow chart that illustrates at a high level how the known technique of relative weight analysis is applied in accordance with aspects of the present invention.

FIG. 7A is a flow chart that illustrates at a high level how the known technique of relative weight analysis is applied in accordance with aspects of the present invention.

At 720 in FIG. 7A, the "outcome" questions (i.e., those relating to intent to stay and inspiration to the best work) are established as the dependent variables, and the other more detailed ("core") questions are established as the independent variables. At 721, the independent variables are transformed so as to control for correlations among them. At 722, each dependent variable is regressed on the new set of transformed (uncorrelated) independent variables. At 724, the resulting relative weights calculated for each independent variable are averaged across the two dependent variables to produce a single weight for each independent variable. At 726, the work environment index is calculated as the sum of the weighted responses for each independent variable.

The result of the relative weight analysis is a relative weight for each question with respect to each of the two dependent variables. In some embodiments, the weight to be applied to each question for the subsequent operational analyses may be calculated as the mean of the question's two relative weights provided by the relative weight analysis of the experimental survey results. (That is, the amount of importance relative to the two dependent variables may be weighted equally—i.e., 50/50—in calculating the operational weighting for the questions; alternatively the weighting of the two dependent variables may be other than 50/50.)

In some embodiments, the importance of each question relative to the dependent variables may be determined by a technique other than relative weight analysis. Examples of such other techniques include calculating the statistical correlation (r) for the individual question results relative to the dependent variables, or calculating standardized regression coefficients ($\beta$) for the individual question results.

Figure 8:
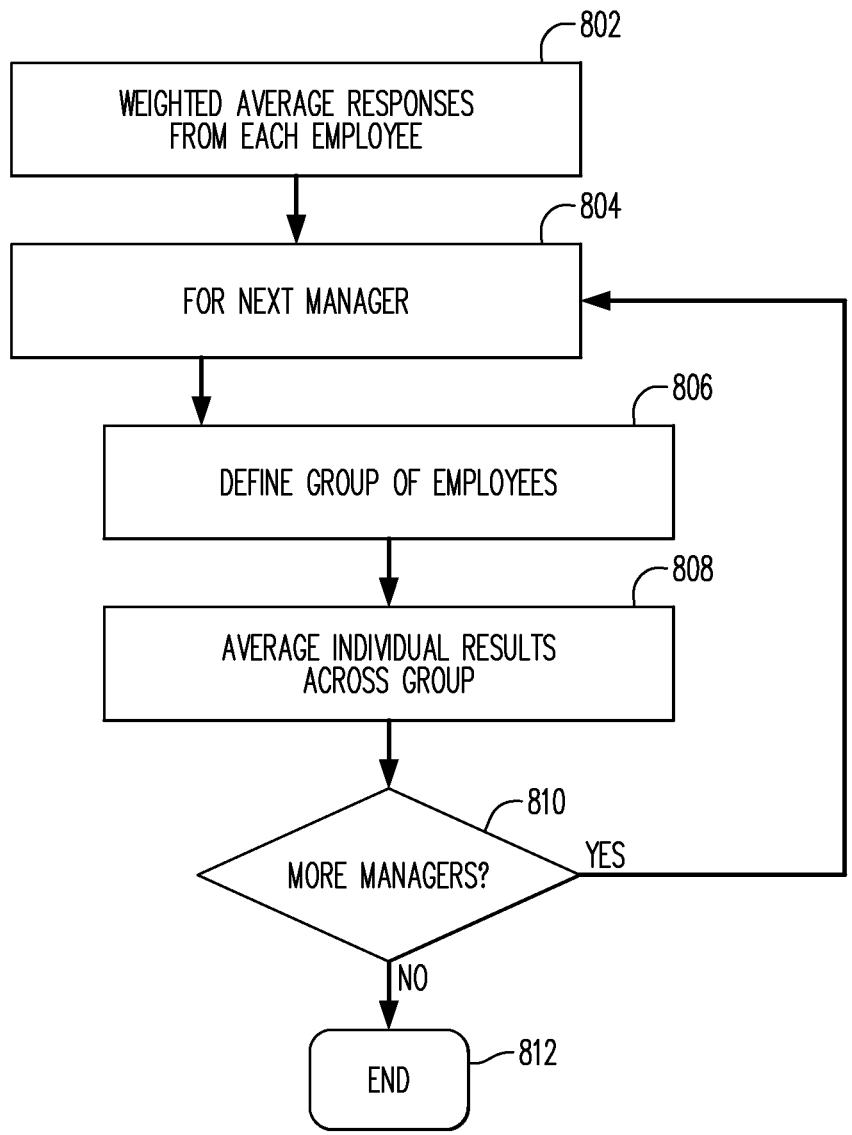
FIG. 8 is a flow chart that illustrates details of the process of FIG. 6.

With the above-described experimental determination of suitable weighting for the individual question scores, the operational survey analysis may proceed (as indicated at 610 in FIG. 6) to generate WEI scores (results) for each manager (or at least for each manager who supervises—directly or indirectly—at least a minimum number of employees). In some embodiments, the individual WEI score derived from each employee in the manager's department may be aggregated with all of the WEI scores for employees in the manager's department, and then divided by the number of employees to produce the manager's WEI score. FIG. 8 is a flow chart that summarizes the calculation of the WEI scores. At 802, the above-described weighted average (individual employee WEI result) is calculated for each employee. At 804, a processing loop is defined for each manager who qualifies (by number of subordinates) to receive a WEI score. At 806, the group of employees who report directly and indirectly to a manager is defined (e.g., by reference to the type of organizational hierarchy information depicted in FIG. 1). At 808, the individual employee WEI results are averaged across the group of employees defined for the manager to arrive at the WEI score for the manager. At 810 it is determined whether there remain more managers for whom WEI scores are to be calculated. At 812, the process of FIG. 8 ends, if WEI scores have been calculated for all qualifying managers.

FIG. 8A is a diagram that illustrates calculations performed as part of the process of FIGS. 6 and 8. In particular, FIG. 8A illustrates a simplified example of how a WEI score may be calculated for a single manager (hereinafter referred to as "M"). In this example, M is assumed to have five employees under his/her direction. In the drawing, they are referred to as "employee 1", "employee 2", etc. It is also assumed that the survey on which the WEI score is based consists of 15 questions.

Reference numeral 820 in FIG. 8A indicates a table that lists the scores assigned in response to each survey question by each employee in M's group. That is, table 820 represents the raw results of the survey for M's group.

Reference numeral 822 indicates a table that is derived from table 720 by applying the per question weights to the employee response scores. The last column 824 in table 822 sums across the preceding columns to provide the WEI score attributable to each employee's survey responses.

Another table is indicated by reference numeral 826. In table 826, column 828 directly reproduces column 824 from table 822, and thus again sets forth the WEI scores attributable to each employee's survey responses. The entry at 830 represents the average of the individual respondent WEI scores, and thus is the WEI score for manager M.

Table 832 schematically represents a portion of a rank-ordering of all of the managers' WEI scores in the organization. In this assumed example, M's WEI score ranks at the 77th percentile, as indicated by entry 834.

Finally, at 836, it is indicated that M's WEI score places him/her in the "blue" performance category: i.e., in a quite satisfactory category.

Referring again to FIG. 6, at 612, the WEI scores for the managers are fed from the survey analysis component 212 (FIG. 2) to the performance review component 214, for use by the performance review component 214 in determining at least some of the performance goals for the managers. At 614, the performance review component 214 generates the WEI-related performance goals for each manager. In general, the performance goals may call for managers whose WEI scores are low to increase their WEI scores by a defined amount in the next year; and for managers whose WEI scores are high or adequate to at least maintain their WEI scores. For example, each WEI-related performance goal may set a target range for the next year's WEI score for the manager. If the WEI score for the next year falls short of the target range, the manager's performance will be considered inadequate in this respect. On the other hand, if the manager's WEI score for the next year exceeds the target range, the manager's performance will be considered to have exceeded expectations in this respect. In some embodiments, the WEI-related performance goal may constitute a significant portion of the over-all evaluation of the manager's performance.

FIG. 8B is a table that illustrates an example approach to setting work environment index goals for managers as part of the process of FIG. 6. More specifically, FIG. 8B is a table showing example results of WEI scores across an organization, including a categorization of WEI scores into more satisfactory and less satisfactory levels. FIG. 8B also indicates one example manner in which the categories/levels of WEI scores may be used to set WEI score performance goals for the next year.

In FIG. 8B, column 852 lists the category level designations as A-E. Column 854 indicates that category A corresponds to the top 10% of WEI scores across the organization. Category B consists of the next highest ranking 20% of WEI scores (roughly the 70th percentile to the 90th percentile). Category C corresponds to the 40th to 70th percentile of WEI scores; category D consists of the WEI scores from the 10th to 40th percentiles; and category E represents the bottom 10% of the WEI scores.

Columns 856 and 858 delimit the actual lower and upper bound WEI scores for the five letter categories. As seen from columns 856 and 858, in this example: All WEI scores of 4.284 and above fall in the "A" category. The "B" category consists of scores that are less than or equal to 4.283, but not less than 4.056; the "C" category consists of scores that are less than or equal to 4.055, but not less than 3.812; the "D" category consists of scores that are less than or equal to 3.811, but not less than 3.431. All scores of 3.430 or less are in the "E" category.

Column 860 indicates, according to one example, improvement goals that are to be required in WEI scores for managers in each letter category. For the top two categories, no improvement is required, as indicated by the "0%" entries. For managers whose WEI score is in category "C", the goal is that they improve their WEI score (as derived from the next annual WEI survey results) by 1%. For managers whose WEI score is in category "D", the goal is that they improve their WEI score by 2% in the next year. For managers whose WEI score is in category "E", the goal is that they improve their WEI score by 7% in the next year.

To accommodate possible random variations in employees' survey responses from year to year, it may be advisable to define a target range for each manager's WEI score goal. The meaning of the range is that the manager's performance with respect to the WEI score meets expectations if the next year's WEI score for the manager falls in the target range. If the manager's WEI score for the next year falls below the range, then his/her performance with respect to WEI is less than satisfactory. If he/she receives a WEI score that is above the target range, then his/her performance with respect to WEI is considered to exceed expectations.

As indicated by column 862 in FIG. 8B, for categories "A" through "D", the target range is defined as plus or minus 0.05 around the WEI performance goal as calculated from the manager's current WEI score and the applicable improvement goal percentage indicated in column 860. For category "E", the lower bound of the target range, in this example, is the manager's current WEI score multiplied by 1.07, and the upper bound of the target range is 0.05 higher than the figure produced by that multiplication.

To give one concrete example of a WEI performance goal and the associated target range, assume that a manager's current WEI score is 3.700. This falls in the "D" category, so that the improvement goal is 3.774 (2% improvement), and the target range is 3.724 to 3.824 (plus or minus 0.05 around the goal).

The improvement goal percentages indicated in column 860 and the target ranges indicated in column 862 may be varied from year to year and/or from embodiment to embodiment. In some embodiments, the improvement goal percentages (column 860) may be determined in such a way as to support the organization's overall goal for improvement in WEI scores. Especially the improvement goals set for managers in category "E" may be relatively high if the organization wishes to make a significant improvement in WEI scores.

Figure 9:
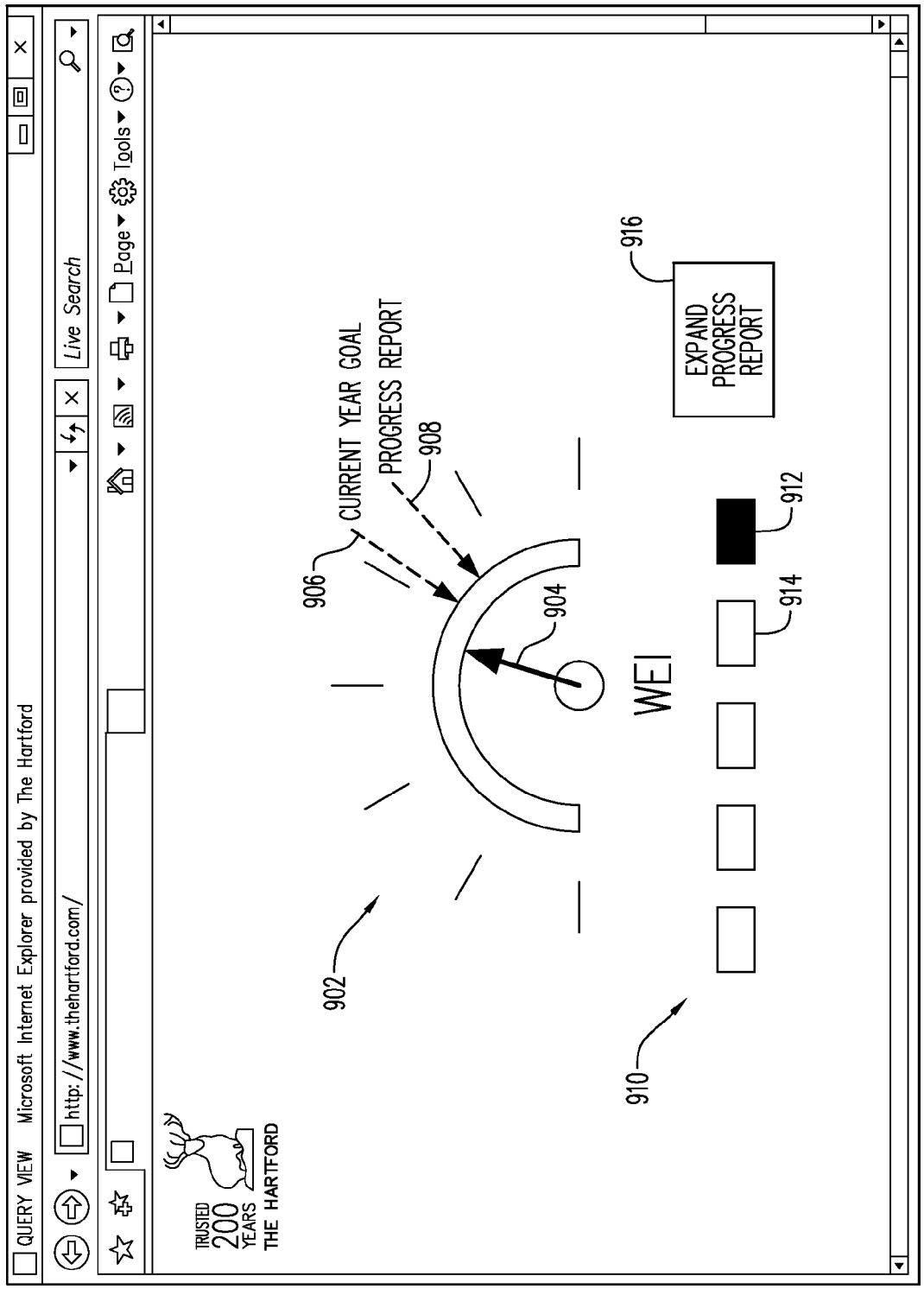
FIGS. 9 and 10 are example screen displays that may be provided to management employees by the system of FIGS. 2 and 3.

Referring once more to FIG. 6, at 616, the computer system 200 displays information to the managers to inform them of their WEI scores and related performance goals. For example, the information may be inserted into individual webpages devoted to and accessible by the managers. These individual manager webpages may be stored in the HR server computer 202 and downloaded on demand for display on the individual managers' user computers 204. FIG. 9 is an example "dashboard" screen display which illustrates a format in which the WEI score and performance goal information for a particular manager may be downloaded for display on the manager's computer. The screen display of FIG. 9 includes a "dial gauge" graphical element 902, which includes an arrow 904 to indicate in graphical form the manager's latest year-end WEI score. Dashed line arrow 906 graphically indicates the manager's current year performance goal for his/her WEI score. Dashed line arrow 908 graphically indicates the manager's current mid-year "progress report" WEI score.

For the purposes of FIG. 9, it is assumed that the manager in question is at a relatively high level in the organization and has several levels of managers reporting to him/her. The horizontal sequence of bars 910 allows the manager to navigate among WEI score information for the individual managers in his/her organization. The filled-in bar 912 indicates that the manager is currently viewing the highest level WEI score information for his/her organization (i.e., the WEI score determined for the manager himself/herself). If he/she were to click on the next bar (item 914) to the left, he/she would be presented with another screen display (not shown) which would present several similar WEI score dial gauges, each for a respective one of the managers who directly report to the top level manager in question. Similarly, clicking on other bars further to the left would give the manager access to WEI score information for managers at still lower levels in his/her department.

Figure 10:
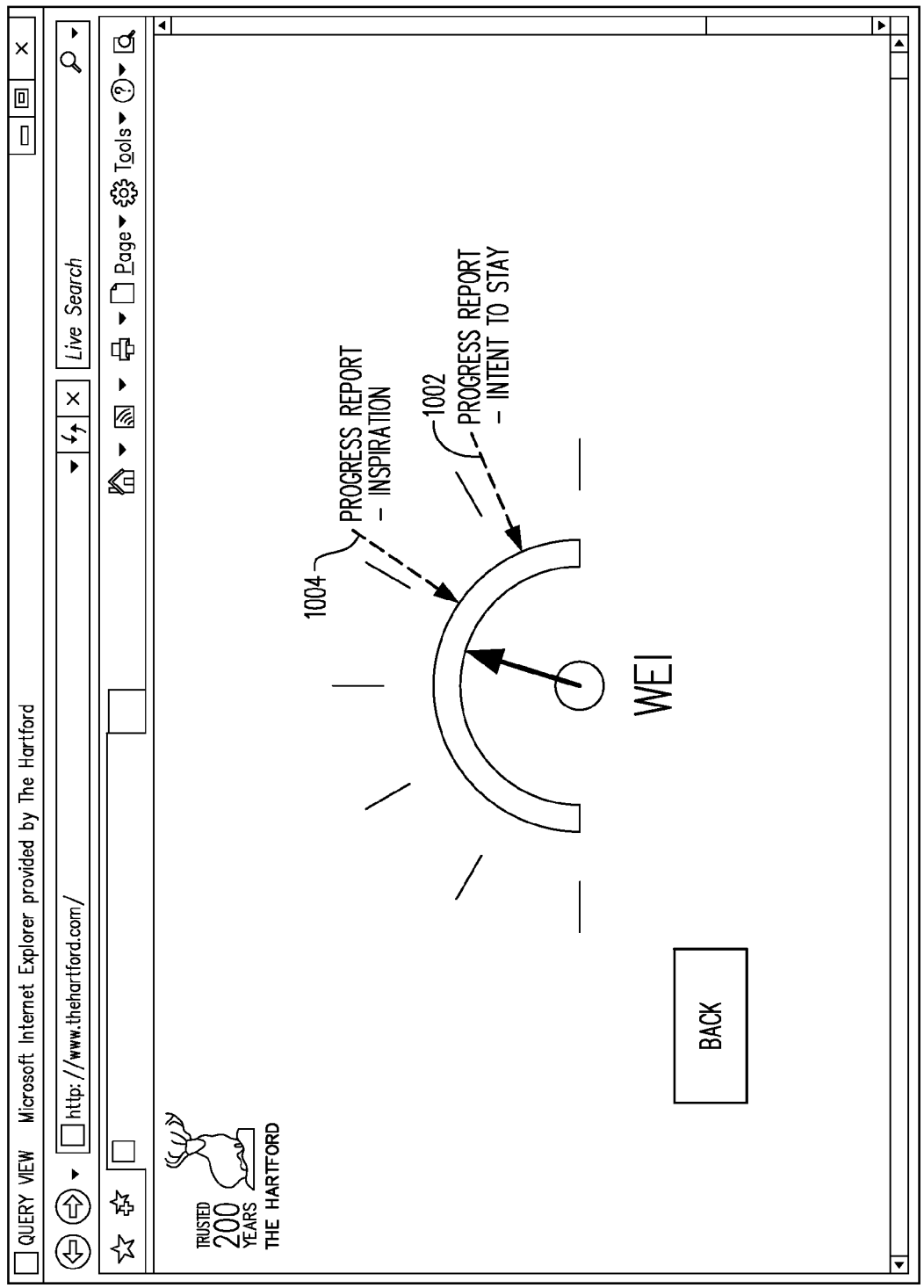

Other screen displays may also be provided to the manager to allow him/her to "drill down" in other ways with respect to his/her WEI score and the underlying more detailed information. For example, the screen display of FIG. 9 shows a button 916, which the manager may click to obtain information that expands the progress report score to provide constituent information indicating to what extent that score is attributable to each of the two dependent variables described above (i.e., employees' intent to stay and inspiration to work well). Thus clicking on the button 916 in FIG. 9 may cause the screen display of FIG. 10 to be downloaded to and displayed on the manager's computer.

FIG. 10 again shows a dial gauge, but in this case one dashed line arrow 1002 indicates the portion of the progress report WEI score that is attributable to the "intent to stay" dependent variable, while the dashed line arrow 1004 indicates the portion of the progress report WEI score that is attributable to the "inspiration" dependent variable.

In other embodiments, further and/or other navigation options may be offered on the screen displays, including, for example, navigation buttons that allow the manager to drill down in other ways. To give just one example, the current year-end WEI score may be decomposed in a similar manner to the progress report WEI score.

According to other options for drilling down into the survey results, managers may also be provided with the average scores assigned by their subordinates to each of the survey questions. In this way, and particularly for managers with relatively low WEI scores, the managers are able to see what aspects of the work environment their subordinates consider to be less satisfactory.

In some embodiments, the organization's human resources department may acquire and/or develop training and instructional resources to aid managers in improving their WEI scores. This information may be distributed to managers in various ways, such as interactive online training modules, printed materials and/or face-to-face training sessions. For example, if a manager has received low scores on a particular survey question, he/she may take an online training program or study a printed guide to learn about specific behaviors that he/she may implement to improve the work environment as related to the subject survey question.

In addition to or instead of the dashboard-type displays shown in the drawings, the WEI score and/or performance goal information may also be presented to the manager in other ways, including in the form of bargraphs, tables and/or text. The WEI-related performance goal may be presented in the same screen display (not shown) along with other performance goals assigned to the manager.

Referring again to FIG. 6, at 618, the performance review component 214 tracks for each manager how he/she performs against his/her WEI-related performance goal. This may be done, for example, based on the next year-end WEI score that is generated for the manager by the survey analysis component 212. Based on this performance review component, the manager may be assigned an overall performance rating, which may also be based on other performance goals assigned to the manager. As suggested by dashed line 620 in FIG. 6, generating the WEI scores and the WEI-related performance goals may be performed in an ongoing annual cycle. In some embodiments, for example, the survey may be administered and the results analyzed twice per year, at six month intervals. One administration of the survey may be used to produce the year-end WEI scores, while the next may be used for the progress report WEI scores.

In some embodiments, the results of operational administration of the survey may be analyzed by relative weight analysis, or by other techniques, to confirm or adjust the relative weightings of the survey questions to be used in subsequent survey cycles.

In some embodiments, at least some aspects of the process of FIG. 6 may be outsourced by the organization to an outside vendor. For example, the vendor may generate the list of questions and administer the survey to the organization's employees. (For example, the employees may use their computers to access a survey webpage hosted by the vendor's server computer (not shown) and may answer the survey questions via input from their computers to the survey webpage.) The vendor may then provide the raw results of the survey (i.e., the employees' answers to each question) as a data download to the organization's computer. The organization's computer may then analyze the data, and generate WEI scores and performance goals for managers.

In other embodiments, steps 608-614 of FIG. 6 (data analysis, generating WEI scores and goals) may also be partly or entirely outsourced to the vendor, with individual managers' information display pages to be downloaded from the vendor's computer to the managers' computers on request from the managers.

In an example embodiment described above, each manager's WEI score is the arithmetic mean of the WEI scores calculated from the sets of answers given by all of the manager's subordinates. That is, all the WEI scores derived from all subordinates are weighted equally in calculating the manager's WEI score. However, this need not necessarily be the case. For example, in some embodiments the response from a manager's direct reports may be weighted more heavily than the responses of those who are further down in the organization hierarchy.

Processes portrayed herein as being performed by one computer may in practice be divided among two or more computers. Processes portrayed herein as being performed by two or more computers may in practice be performed by a single computer.

The process descriptions and flow charts contained herein should not be considered to imply a fixed order for performing process steps. Rather, process steps may be performed in any order that is practicable.

As used herein and in the appended claims, the term "computer" refers to a single computer or to two or more computers in communication with each other and/or operated by a single organization or by two or more organizations that are partly or entirely under common ownership and/or control.

As used herein and in the appended claims, the term "processor" refers to one processor or two or more processors that are in communication with each other.

As used herein and in the appended claims, the term "memory" and/or "data storage device" refers to one, two or more memory and/or data storage devices.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer system comprising:
a survey results storage module for storing survey data indicative of employees' responses to a set of survey questions, the survey questions for measuring attitudes of the employees towards their work environment and including all of: (a) a question measuring employee intent to seek other employment, (b) a question measuring employee inspiration toward good work performance, and (c) a plurality of core questions;
a survey analysis component coupled to the survey results storage module, the survey analysis component analyzing the survey data to generate a plurality of work environment index results each expressed as a single score for each of a plurality of management employees, each of said work environment index results corresponding to a respective management employee and derived from survey data which corresponds to a respective group of the employees, the respective group consisting of ones of said employees who report directly or indirectly to the respective management employee, the survey analysis component including a processor programmed to analyze the survey data stored in the survey results storage module, the respective management employee being one of said plurality of management employees selected based on having a number of employees who report directly or indirectly that is greater than a predetermined threshold, wherein said processor is programmed to analyze the survey data by: (a) establishing a result of the question measuring employee intent to seek other employment and a result of the question measuring employee inspiration toward good work performance as dependent variables, (b) establishing results of the plurality of core questions as a set of independent variables, (c) regressing each dependent variable on the set of independent variables to calculate a relative weight for each independent variable, and (d) calculating said work environment index result for each management employee using a sum of weighted responses for each independent variable;
a performance review component coupled to the survey analysis component for receiving said work environment index results and, for each of said management employees, (a) identifying a category of said respective one of said work environment index results, the category selected based on work environment index results of management employees having similar results, (b) comparing a respective one of said work environment index results with a respective current year work environment goal for said each one of said management employees, and (c) automatically generating, based at least in part on the respective one of said work environment index results and said identified category, a respective subsequent year work environment goal for said each one of said management employees, the respective subsequent year work environment goal including an improvement objective based on said identified category; and
a display component, coupled to the performance review component, for displaying said respective one of said work environment index results and the respective subsequent year work environment goal to said at least one of said management employees.

2. The computer system of claim 1, wherein the display component displays the respective one of the work environment index results as part of a dashboard display.

3. The computer system of claim 1, wherein the survey analysis component calculates the work environment index results as weighted averages of average scores assigned to the survey questions by the groups of employees.

4. The computer system of claim 1, wherein the work environment goals are expressed as target ranges for said work environment index results.

5. The computer system of claim 1, wherein each group of employees includes at least five employees.

6. The computer system of claim 1, wherein the work environment goals and the work environment index results are expressed as decimal values within a range of one to five.

7. A computer-implemented method comprising:
storing, in a data storage device, survey data indicative of employees' responses to a set of survey questions, the survey questions for measuring attitudes of the employees towards their work environment and including all of: (a) a question measuring employee intent to seek other employment, (b) a question measuring employee inspiration toward good work performance, and (c) a plurality of core questions;
analyzing, with a processor, the survey data to generate a plurality of work environment index results each expressed as a single score for each of a plurality of management employees, each of said work environment index results corresponding to a respective management employee and derived from survey data which corresponds to a respective group of the employees, the respective group consisting of ones of said employees who report directly or indirectly to the respective management employee, the respective management employee being one of said plurality of management employees, wherein said analyzing comprises: (a) establishing a result of the question measuring employee intent to seek other employment and a result of the question measuring employee inspiration toward good work performance as dependent variables, (b) establishing results of the plurality of core questions as a set of independent variables, (c) regressing each dependent variable on the set of independent variables to calculate a relative weight for each independent variable, and (d) calculating said work environment index result for each management employee using a sum of weighted responses for each independent variable;
storing said work environment index results in the data storage device;
for each of said management employees, the processor processing said work environment index results to (a) identify a category of said respective one of said work environment index results, the category selected based on work environment index results of management employees having similar results, (b) compare a respective one of said work environment index results with a respective current year work environment goal for said each one of said management employees, and automatically generate, based at least in part on the respective one of said work environment index results and said identified category, a respective subsequent year work environment goal for said each one of said management employees, the respective subsequent year work environment goal including an improvement objective based on said identified category; and
displaying, on at least one display component, said respective one of said work environment index results and the respective subsequent year work environment goal to said at least one of said management employees.

8. The method of claim 7, wherein the display component displays the respective one of the work environment index results as part of a dashboard display.

9. The method of claim 7, wherein the processor calculates the work environment index results as weighted averages of average scores assigned to the survey questions by the groups of employees.

10. The method of claim 7, wherein the work environment goals are expressed as target ranges for said work environment index results.

11. The method of claim 7, wherein each group of employees includes at least five employees.

12. The method of claim 7, wherein the work environment goals and the work environment index results are expressed as decimal values within a range of one to five.

13. A non-transitory, computer-readable medium storing program code executable by a computer processor to:

store, in a data storage device, survey data indicative of employees' responses to a set of survey questions, the survey questions for measuring attitudes of the employees towards their work environment and including all of: (a) a question measuring employee intent to seek other employment, (b) a question measuring employee inspiration toward good work performance, and (c) a plurality of core questions;

analyze, with a processor, the survey data to generate a plurality of work environment index results each expressed as a single score for each of a plurality of management employees, each of said work environment index results corresponding to a respective management employee and derived from survey data which corresponds to a respective group of the employees, the respective group consisting of ones of said employees who report directly or indirectly to the respective management employee, the respective management employee being one of said plurality of management employees, wherein said analyzing comprises: (a) establishing a result of the question measuring employee intent to seek other employment and a result of the question measuring employee inspiration toward good work performance as dependent variables, (b) establishing results of the plurality of core questions as a set of independent variables, (c) regressing each dependent variable on the set of independent variables to calculate a relative weight for each independent variable, and (d) calculating said work environment index result for each management employee using a sum of weighted responses for each independent variable;

store said work environment index results in the data storage device;

for each of said management employees, process said work environment index results to (a) identify a category of said respective one of said work environment index results, the category selected based on work environment index results of management employees having similar results, (b) compare a respective one of said work environment index results with a respective current year work environment goal for said each one of said management employees, and automatically generate, based at least in part on the respective one of said work environment index results and said identified category, a respective subsequent year work environment goal for said each one of said management employees, the respective subsequent year work environment goal including an improvement objective based on said identified category; and display, on at least one display component, said respective one of said work environment index results and the respective subsequent year work environment goal to said at least one of said management employees.

14. The medium of claim 13, wherein the display component displays the respective one of said work environment index results as part of a dashboard display.

15. The medium of claim 13, wherein said work environment index results are calculated as weighted averages of average scores assigned to the survey questions by the groups of employees.

16. The medium of claim 13, wherein the work environment goals are expressed as target ranges for said work environment index results.

17. The medium of claim 13, wherein each group of employees includes at least five employees.

18. The medium of claim 13, wherein the work environment goals and said work environment index results are expressed as decimal values within a pre-determined range.

* * * * *